United States Patent
Yeates et al.

(10) Patent No.: US 7,412,603 B2
(45) Date of Patent: Aug. 12, 2008

(54) METHODS AND SYSTEMS FOR ENABLING SECURE STORAGE OF SENSITIVE DATA

(75) Inventors: Anthony Yeates, Redmond, WA (US); Pavel Dournov, Redmond, WA (US); Kirk Blackwood, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 10/728,396

(22) Filed: Dec. 5, 2003

(65) Prior Publication Data

US 2005/0125698 A1 Jun. 9, 2005

(51) Int. Cl.
*H04L 9/00* (2006.01)
(52) U.S. Cl. .............. 713/182; 713/183; 713/184; 713/185; 726/2
(58) Field of Classification Search ............ 726/1–2, 726/4–5, 7–8, 17–19, 21, 27, 30, 34; 713/168, 713/193, 182–185; 705/16–18; 380/229, 380/241, 255, 28–29
See application file for complete search history.

(56) References Cited

U.S. PATENT DOCUMENTS

| | | | | |
|---|---|---|---|---|
| 6,038,563 | A * | 3/2000 | Bapat et al. ............... 707/10 |
| 6,446,092 | B1 * | 9/2002 | Sutter ..................... 707/203 |
| 6,959,394 | B1 * | 10/2005 | Brickell et al. ............. 726/5 |
| 6,986,039 | B1 * | 1/2006 | Leah et al. ............... 713/155 |
| 7,000,108 | B1 * | 2/2006 | Yarsa et al. .............. 713/167 |
| 7,020,645 | B2 * | 3/2006 | Bisbee et al. ............... 707/1 |
| 7,080,260 | B2 * | 7/2006 | Johnson ................... 713/193 |
| 7,082,414 | B2 * | 7/2006 | Ohtsuka ..................... 705/51 |
| 7,114,080 | B2 * | 9/2006 | Rahman et al. ............ 713/186 |
| 7,167,564 | B2 * | 1/2007 | Asano et al. .............. 380/279 |
| 7,170,462 | B2 * | 1/2007 | Ihara et al. ................ 343/788 |
| 7,171,564 | B2 * | 1/2007 | Kelley et al. ............. 713/183 |
| 7,178,025 | B2 * | 2/2007 | Scheidt et al. ............ 713/168 |
| 7,194,621 | B1 * | 3/2007 | Nguyen et al. ............ 713/162 |

OTHER PUBLICATIONS

Bellare, Mihir. Et al. "Authenticated Key Exchange Secure Against Dictionary Attacks." *Advances in Crytology.* vol. 1807, 2000. pp. 139-155.

(Continued)

*Primary Examiner*—Kimyen Vu
*Assistant Examiner*—Leynna T Truvan
(74) *Attorney, Agent, or Firm*—Westman, Champlin & Kelly, P.A.

(57) ABSTRACT

Systems and methods are disclosed for storing sensitive data in a database, such as an application database or a dedicated application security database or store. In accordance with one aspect of the invention, user passwords are not directly stored in a database; but instead, when a password is entered, a one-way hash of the password phrase is produced for storage and/or comparison purposes. In accordance with another aspect, individual authorized application users are each aligned with their own version of an application-wide security key such that it becomes unnecessary to directly store the key in its original form. The security key is used to process sensitive data. In accordance with another aspect, a user's version of the application-wide security reflects an encryption-based relationship to the user's password. Various embodiments also support flexible access to particular collections of sensitive data based on user account and/or user role information.

9 Claims, 4 Drawing Sheets

OTHER PUBLICATIONS

Bellovin and Meritt, Steven M. and Michael. "Augmented Encrypted Key Exchange: {A} Password-Based Protocol Secure Against Dictionary Attacks and Password File Compromise", *Proceedings of the 1st {ACM} Conference on Computer and Communications Security.* Nov. 1993. pp. 244-250.

Haller, Neil M., "The {S/Key} One-Time Password System". 1992.

National Institute of Standards and Technology. {FIPS PUB 181} Standard for {Automated Password Generator (APG}); Oct. 1993. 1-9.

Rivest and Shamir, Ronald L. and Adi. "PayWord and MicroMint: Two Simple Micropyament Schemes" MIT Laboratory for Computer Science. Apr. 27, 2001, pp. 1-18.

Karp, Alan H. "Site-Specific Passwords", abstract. May 2003. pp. 1-9.

* cited by examiner

METHODS AND SYSTEMS FOR ENABLING SECURE STORAGE OF SENSITIVE DATA

BACKGROUND OF THE INVENTION

The present invention generally pertains to data security systems. More particularly, the present invention pertains to methods for storing sensitive data in a database.

Many software applications and services depend on the security of a central database. For example, computing environments are known wherein multiple installations of a software application are provided with simultaneous access to sensitive data stored in a central database. In one specific example, it is common for retail management software applications to be installed on multiple computers connected by a Local Access Network (LAN) that operate in conjunction with a central database that contains sensitive data.

When access to a central database is shared among multiple application installations, there is a threat that users other than application operators will access the central database to misuse or compromise sensitive data. Applications are generally not the only way of connecting to a database. In many cases, it is theoretically possible to access the database using relatively standard tools.

Accordingly, it becomes important that access to sensitive data stored in a central database be reserved for authorized users, for example, users who can demonstrate proper authentication credentials. It is also important that collections of authentication credentials associated with authorized users be secured from unauthorized tampering.

Even for authorized application users, it can be desirable for a system to be flexible enough to support a distribution of access rights based on the needs and security policies of a given application host. For example, it can be desirable for a system to enable certain predetermined access privileges to be reserved for certain user accounts, for certain user roles, or otherwise distributed. Providing database security without sacrificing data access flexibility is becoming an increasingly important consideration.

Many of the current database security solutions are implemented primarily on a user interface level. Many solutions involve some form of password protection wherein passwords are stored in an open text format, usually in storage such as a datastore, database or password file, making them particularly susceptible to being accessed and misused. In many cases, at least a second-line of defense is needed to enhance data security.

SUMMARY OF THE INVENTION

Embodiments of the present invention pertain to systems and methods for storing sensitive data in a database, such as an application database or a dedicated application security database or store. In accordance with one aspect of the present invention, user passwords are not directly stored in a database; but instead, when a password is entered, a one-way hash of the password phrase is produced for storage and/or comparison purposes. In accordance with another aspect, individual authorized application users are each aligned with their own version of an application-wide security key such that it becomes unnecessary to directly store the key in its original form. The security key is used to process sensitive data. In accordance with another aspect, a user's version of the application-wide security reflects an encryption-based relationship to the user's password. Various embodiments also support flexible access to particular collections of sensitive data based on user account and/or user role information.

DETAILED DESCRIPTION OF ILLUSTRATIVE EMBODIMENTS

Figure 1:
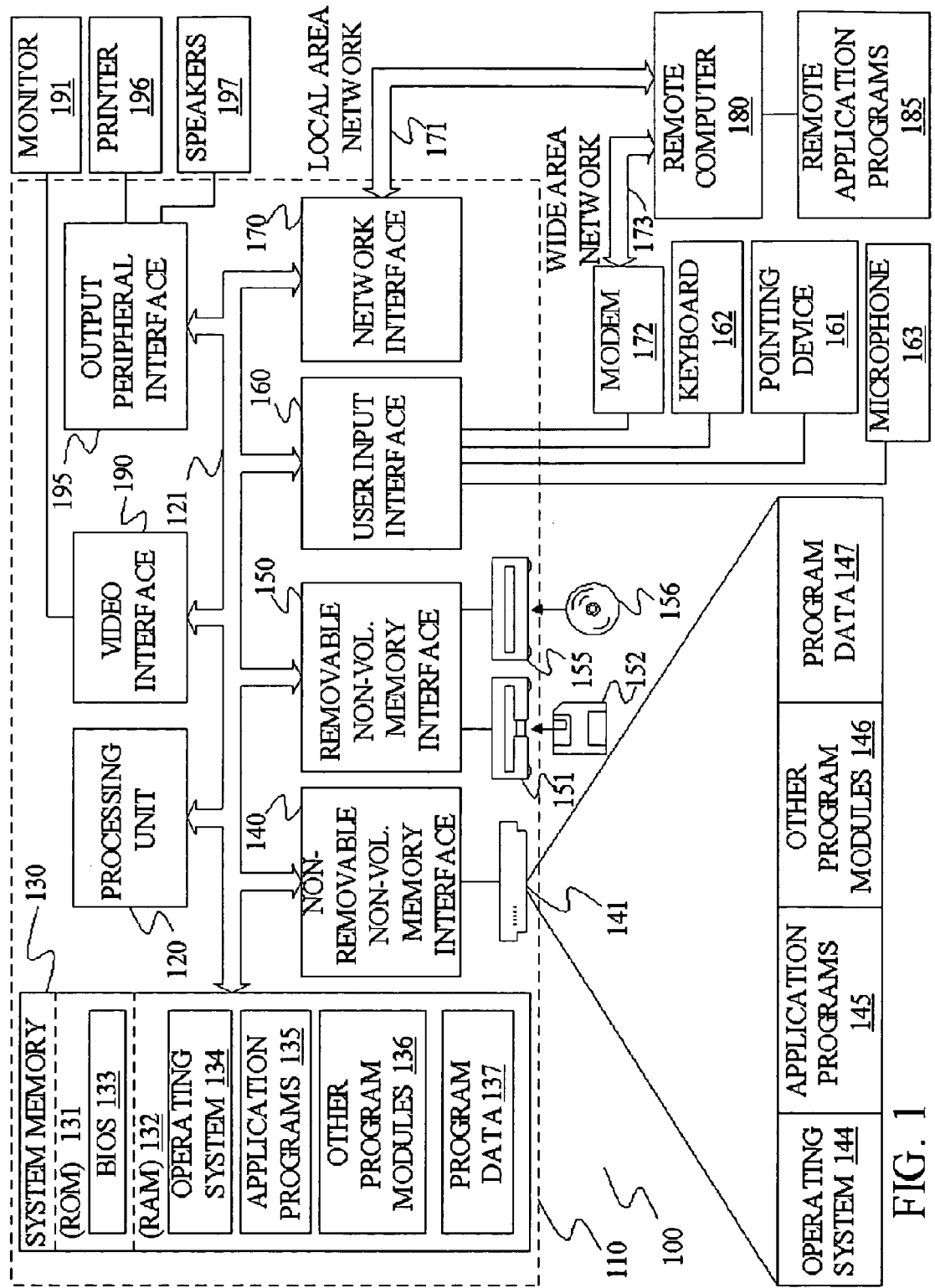
FIG. 1 is a block diagram of one computing environment in which the present invention may be practiced.

FIG. 1 illustrates an example of a suitable computing system environment 100 within which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, point-of-sale terminals, minicomputers, tablet computers, mainframe computers, distributed computing environments that include any of the above systems or devices, and the like. Other suitable examples include various retail-oriented devices such as, but not limited to, self-checkout systems, point-of-sale terminals, self-service kiosks, Electronic Cash Registers, and Electronic Payment Terminals (e.g., veriphone terminals).

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, USB, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, touch-sensitive screen, magnetic strip reader, magnetic ink check reader, smart card reader, signature-capture device, RFid/AutoID reader, Bar-code scanner, number pad, electronic payment terminal (stand alone or connected to a terminal—e.g., via a network, USB or serial connection), electronic weighing scale, biometric security input device (e.g., eye scanner, thumb print reader, etc.), or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks such as wireless networks. Such networking environments are commonplace in offices, enterprise-wide computer networks, intranets and the Internet. Applicable wireless networks also include, but are not limited to, wireless LANS/Wi-Fi, and also IP over cellular (telephone) communications networks. It should be noted that other means of wirelessly connecting to a remote PC are also within the scope of the present invention, such as a bluetooth connection or another point-to-point connection means.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
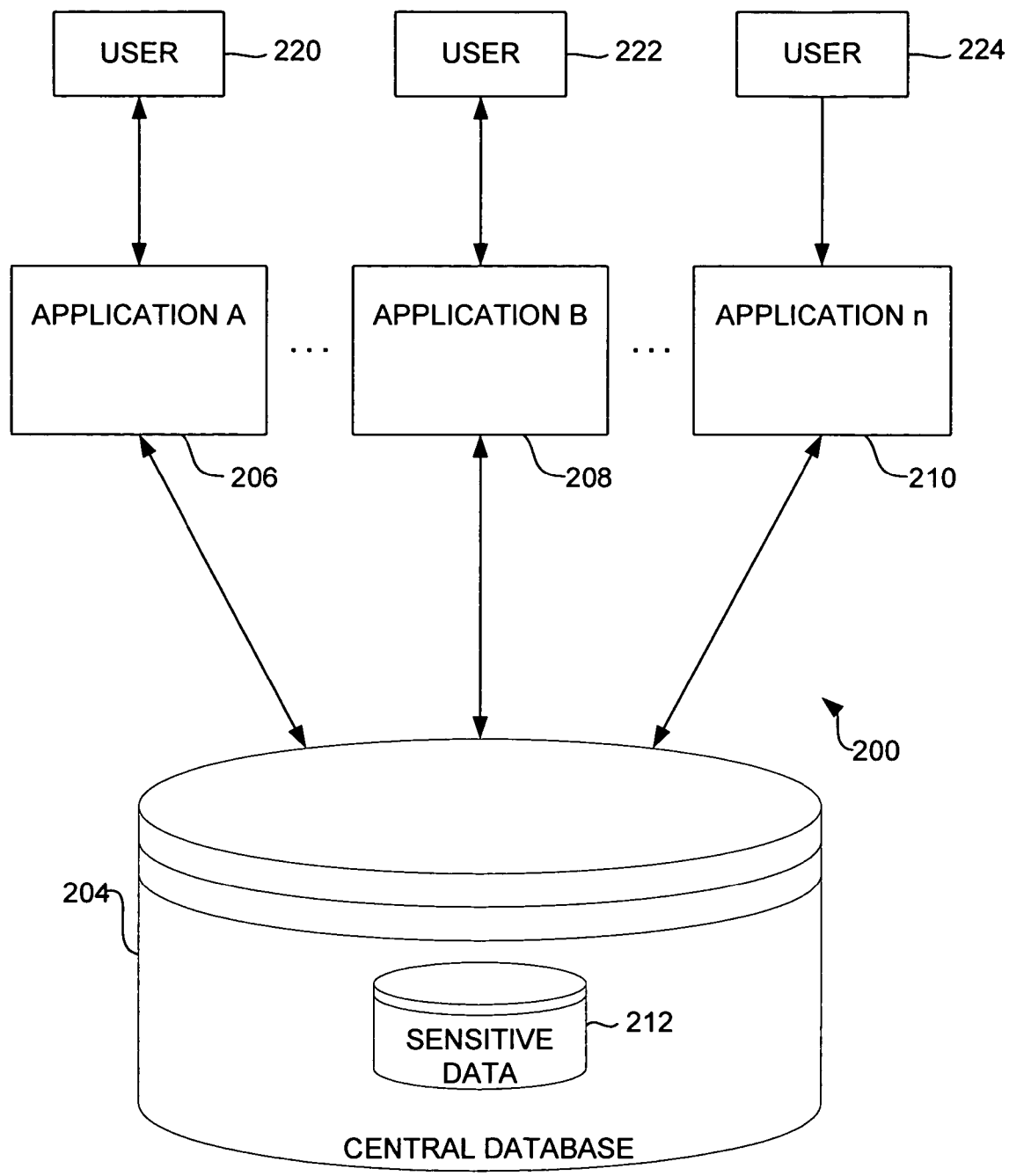
FIG. 2 is a block diagram of a data security system.

FIG. 2 is a block diagram of an exemplary data security system 200 within which embodiments of the present invention can be applied. System 200 is only one example of a suitable data security system and is not intended to suggest any limitation as to the scope of use or functionality of the invention. Neither should system 200 be interpreted as having any dependency or requirement relating to any one or combination of illustrated components.

Within system 200, applications 206, 208 and 210 are shown in communication with a central database 204. While three applications have been shown, the system could actually include more or fewer applications. In accordance with one embodiment, each individual application is implemented in a separate socket that is linked by a network (e.g., LAN, Internet, etc.) to central database 204.

The term "socket", as it is used herein, is intended to describe a device (e.g., any device described in relation to FIG. 1) connected to a network (e.g., a LAN or the Internet) directly or indirectly. Sockets will be described herein as running a software application, for example a retail management application. It should be noted that, without departing from the scope of the present invention, more than one relevant application can be run on a given socket, and a given socket may or may not run any particular application.

A plurality of users 220, 222 and 224 each illustratively interact with their respective application 206, 208 and 210. Through these interactions, data is stored and/or retrieved in association with central database 204. Central database 204 includes a collection of sensitive data 212.

It is illustratively desirable that access to sensitive data 212 be reserved for users of applications 206, 208 and 210 who show authorization through demonstration of proper authentication credentials through submission of an authorized username/password. In accordance with one embodiment, to enhance the security of sensitive data 212, it is encrypted with an application shared encryption key (ASEK). Once encrypted with the ASEK, sensitive data 212 is not generally useful until it is decrypted (e.g., decrypted using the ASEK or a corresponding separate encryption component) or compared to encrypted input.

Figure 3:
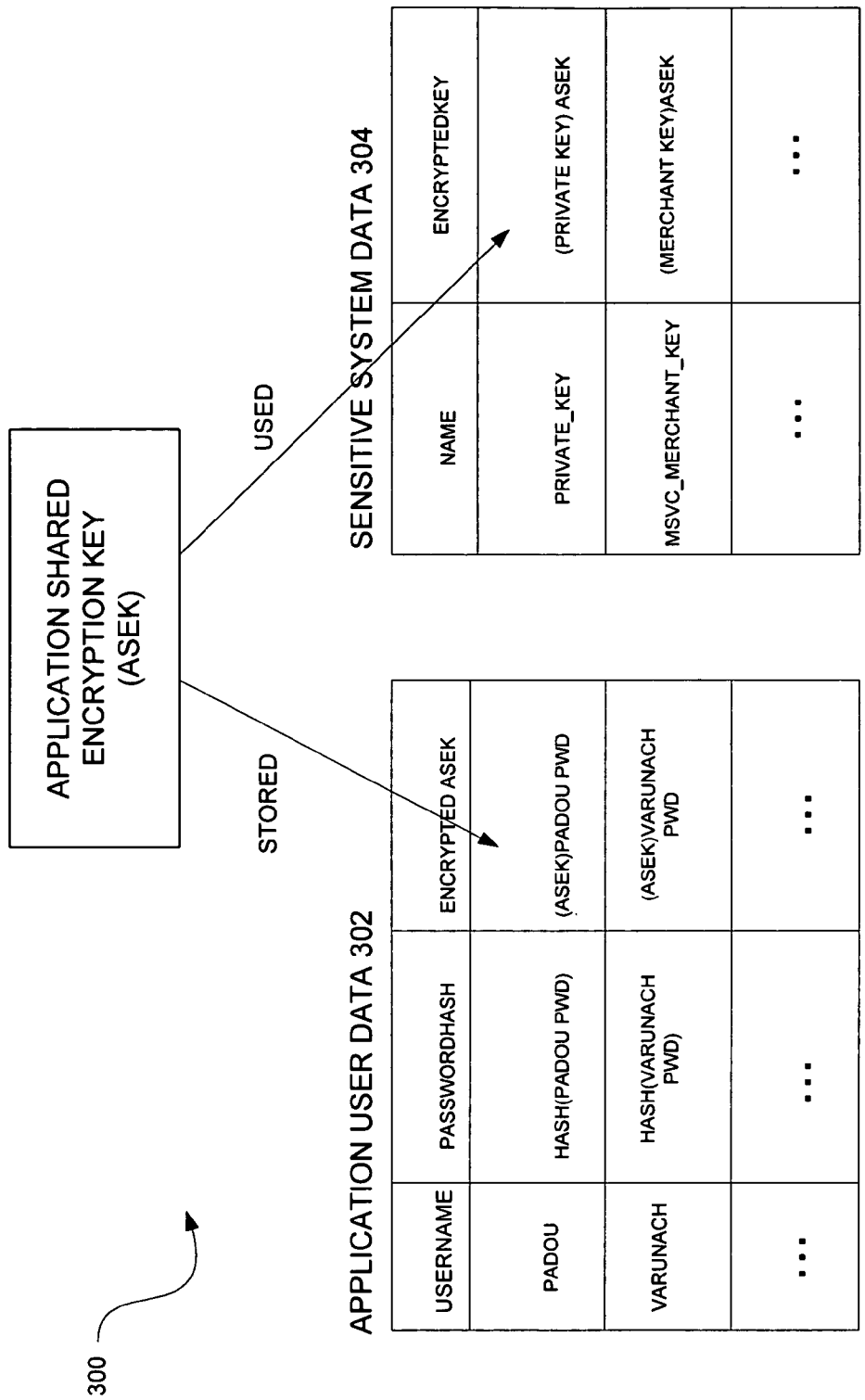
FIG. 3 is a diagrammatic illustration of a data storage system.

FIG. 3, in accordance with one aspect of the present invention is a diagrammatic illustration of a data storage system 300 in accordance with one aspect of the present invention. System 300 includes two database structures, namely application user data 302 and sensitive system data 304.

In the context of the system described in relation to FIG. 2, data 304 is illustratively stored in central database 204 as a part of sensitive data 212. Data 302, which includes authentication information pertaining to authorized users of applications 206, 208 and 210, is illustratively also stored in central database 204. Data 302 can be stored in a separate data structure without departing from the scope of the present invention. In accordance with one embodiment, each application stores its own data 302 that corresponds to its own authorized users. Another embodiment provides centralized sharing of user account information between heterogeneous and homogenous applications. Again, the present invention is not limited to any particular storage location. For the sake of description, it will be assumed that both data 302 and data 304 are stored within a central database (e.g., database 204).

The specific nature of application user data 302 will be described below in detail. Suffice to now say that data 302 includes a list of usernames that correspond to authorized application users. For each username, a user-specific hashed password value is stored. In accordance with one embodiment, the hashed password is optionally "salted" with additional data to strengthen the encryption. For each username, an encrypted, user-specific version of the ASEK is stored. It is notable that neither a user password nor the ASEK are stored in an open text, non-encrypted form. With further regard to the table illustrated in FIG. 3, it should be noted that additional keys, such as, but not limited to, feature- or role-specific keys can be stored in additional columns to support additional functionality. In accordance with one embodiment, role-based keys are stored in the table in association with user accounts to enable role-based access restrictions (or identity-based).

In general terms, sensitive system data 304 is simply sensitive information that is encrypted with the ASEK. Within FIG. 3, for exemplary purposes only, a table that contains a list of keycodes is illustrated. The keycodes (private_key and merchant_key) are illustratively of a sensitive nature such that is desirable that only authorized users of one of the system applications be allowed to access them. As is reflected in the table, each of the key codes is stored in an encrypted state, the encryption being based on the ASEK. It is notable that none of the keycodes are stored in an open text, non-encrypted form.

In accordance with one aspect of the present invention, at least some functionality of applications 206, 208 and 210 is reserved for users who can prove authorization through personal authentication. During the authentication process, a user enters a username and password into an application user interface. In order to evaluate received authentication credentials, a comparison is performed with stored credential records that correspond to authorized users (e.g., application user data 302). As will be described in more detail below, the comparison illustratively involves hashing a received password to support a comparison with stored authorized password values that have been similarly hashed. Assuming the comparison shows that the user is authorized to utilize the application, then the user is able to access his/her version of the ASEK, which can then be used to access and/or store data in association with sensitive system data 304.

It should be emphasized that, in accordance with one aspect of the present invention, user passwords are not directly stored in an open text form. Instead, when a password is registered for the first time, a one-way encryption hash of the password phrase is produced and persisted in the database. In accordance with one embodiment, the hash algorithm utilized is strong enough that the original password phrase cannot be computed or re-stored based on the hash value alone. Thus, there is no hard-coded key anywhere in the application that can be extracted and used to decrypt the password. It is, however, within the scope of the present invention to use any type of hash algorithm, regardless of its strength.

As has been alluded to, in accordance with one aspect of the present invention, a user's password is also utilized to encrypt the ASEK such that each user will have his/her own version. Accordingly, in order to access sensitive data (e.g., data 212, data in table 304, etc.), the user first logs into application 202 with his/her username and password. The hash algorithm is applied to the user's password and a comparison of hash values is performed to determine whether the user is an authorized user of a system application (e.g., comparison of the user's hash value to stored authorized hash values). Assuming authorization, the received password is utilized to decrypt the user's version of the ASEK. The decrypted ASEK can then be utilized to access and/or store sensitive data.

Figure 4:
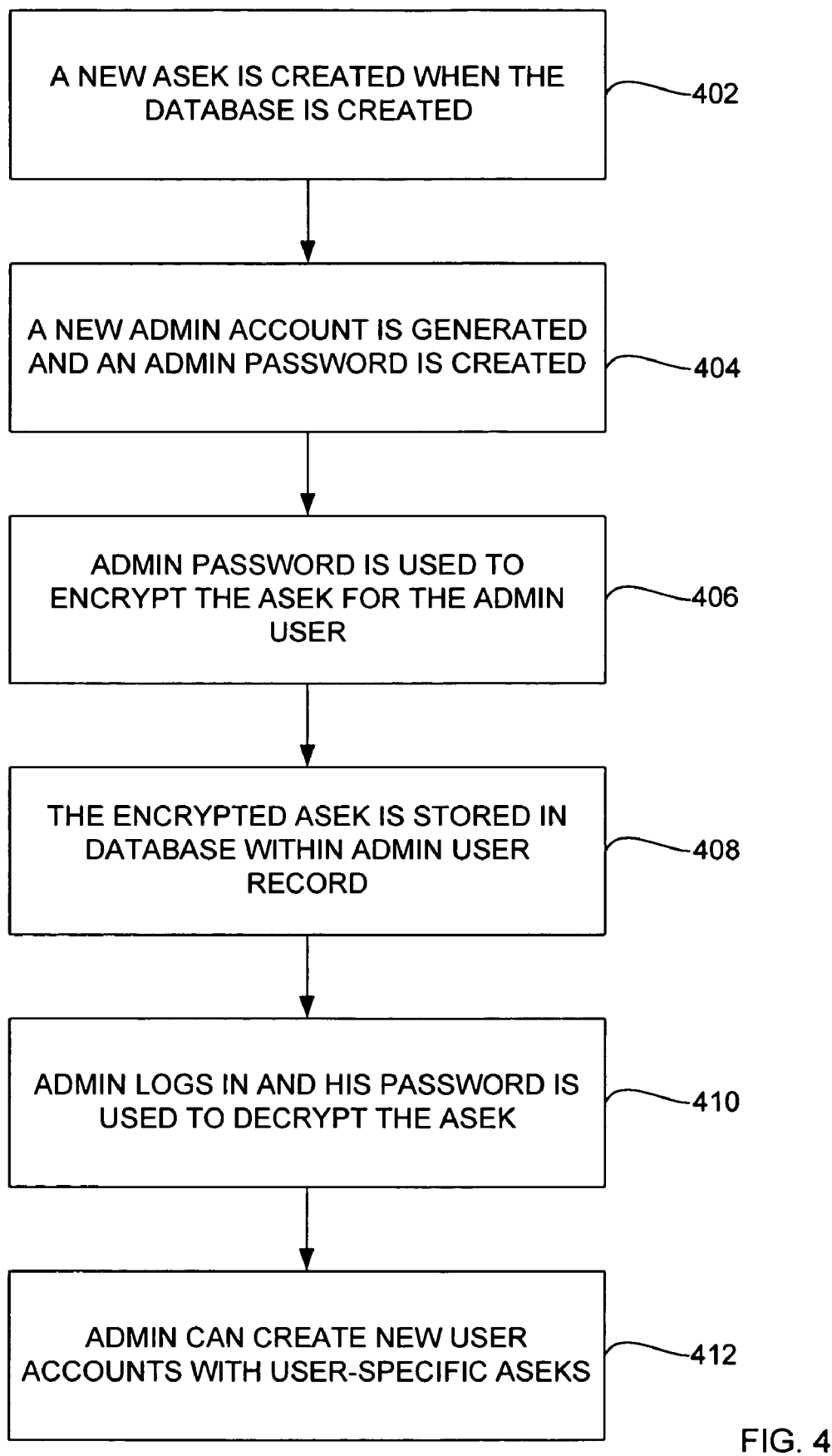
FIG. 4 is a flow chart illustrating steps associated with implementing the data storage system.

FIG. 4 is a flow chart illustrating a set of steps associated with one embodiment of an implementation of the described security system. In accordance with step 402, a new ASEK is generated when a new database is created (e.g., when a new collection of sensitive data is established). In accordance with one embodiment, the ASEK is an arbitrary sequence of characters (e.g., a GUID), the length of the key being selected based on a desired encryption strength. The ASEK will illustratively never be saved in an unencrypted form. In accordance with step 404, after the database is created, a new administrator account is generated. During the process of generating the administrator account, a user-defined password is obtained from the administrator (e.g., he/she is asked for an administrator password prior to creation of the database).

In accordance with step 406, the administrator password is used as a key for encrypting the ASEK for the administrator. In accordance with step 408, the encrypted ASEK is stored in the database in a user accounts table within an administrator user record. Thus, the administrator's version of the ASEK is created.

In accordance with step 410, the administrator logs in to the application, and his/her password is used to decrypt the ASEK. In accordance with one embodiment, with the ASEK, the administrator can store additional sensitive data or access sensitive data that has been encrypted with the ASEK. In accordance with step 412, the administrator can create a new user account for a user other than his/her self. In order to create a new user account, the application will make an individual copy of an encrypted ASEK for each new user by encrypting the ASEK (e.g., using the user's initial password, which is assigned by the administrator) in the user's respective password. In accordance with one embodiment, the administrator creates the user's initial password.

In accordance with one embodiment, a user can change his/her password later. To do so, they provide the old password to first decrypt their version of the ASEK. Then, the new password is provided to encrypt the ASEK again. Therefore, the ASEK is always persisted in an encrypted state.

In accordance with one embodiment, an additional obfuscation algorithm can be applied to passwords before ASEK encryption to strengthen security, for example for systems wherein application policy allows users to have relatively steady passwords.

In accordance with one embodiment, in order to protect the ASEK from a loss in the event that all passwords are lost, an unencrypted ASEK can be copied to a rescue floppy disk that is stored in a physically secure place. Losing the administrator password would be enough to prevent creation of new user accounts with access to sensitive data. Accordingly, a hard "backed-up" of the administrator password is also an optional precaution.

In accordance with one embodiment, passwords within the FIG. 4 system are hashed so as to avoid storage in open text form. Accordingly, before a password is used to decrypt the user's version of the ASEK, a hashed version of the password must be confirmed to match a hashed value for the user.

The security of the described systems and methods is strong at least because passwords are stored differently for each user (limiting their use) and generally cannot be unencrypted. In accordance with one embodiment, the described data security system is implemented in association with a secured database (and/or file system) that provides a first line of defense, the described encryption scheme becoming a second line of defense. In accordance with one embodiment, a third line of defense is provided by construction of an exponential (or similar) back-off algorithm (e.g., first attempt has a one second delay, second attempt has a three second delay, third attempt has a nine second delay, fourth attempt a twenty-seven second delay, and so on) and/or a re-try limit (e.g., no more than three retries per user per minute and no more than ten per hour) into the encryption routine to prevent a hacker from programmatically guessing passwords (perhaps making millions or billions of guesses). Requiring the use of strong passwords within the application is also desirable.

In accordance with one embodiment, additional safeguards can be implemented through restriction of access to specific tables, stored procedures, etc. to certain user accounts (e.g., SQL/Windows user accounts). In accordance with one embodiment, additional columns of role-specific (or user-specific) access information are added to security tables (e.g., the tables of FIG. 3) in order to implement role-specific (or user-specific) access restrictions. In accordance with another embodiment, similar access restrictions are implemented as a "role" (or "user identity") column to filter certain sensitive data based on role (or user identity).

In accordance with one embodiment, passwords are stored outside of the application database (e.g., in a different database, a file, a registry, a certificate store, a secured table in EEPROM or other hardware memory, etc.).

It should be noted that within the context of the described security system, the administrator can reset passwords without data loss. This is possible because the administrator has access to the ASEK, and can assign a new password to a user and use this new password to encrypt a copy of the ASEK for the user.

In accordance with one embodiment, to further restrict access such that not all approved users can necessarily access all sensitive data, keys are specifically assigned to particular roles, for example, store manager, cashier, etc. This supports a more granular control over access to sensitive data.

In accordance with one embodiment, keys are specifically assigned to particular roles security attributes and/or access permissions. In other words, the system supports assignment of users to one or more roles. Roles then have security attributes assigned to them—by default and/or configuration. For example, a security attribute granting access to a first set of functionality could be assigned to manager and supervisor roles but not a cashier role. In accordance with one embodiment, attributes are assigned to users as well as roles. In accordance with another embodiment, the system administrator can create new roles and assign attributes to them.

The data structure illustrated in FIG. 3 shows access functionality distributed based on individual users and user accounts. The data is expressed formulaically. In accordance with one embodiment, at least one additional table is added to support similar functionality based on roles rather than individual identity. In accordance with another embodiment, columns are assigned (e.g., to the tables shown in FIG. 3) to support similar functionality based on roles or individual identity.

Although the present invention has been described with reference to particular embodiments, workers skilled in the art will recognize that changes may be made in form and detail without departing from the spirit and scope of the invention.

What is claimed is:

1. A computer-implemented method for providing data security, the method comprising:

receiving a password from a user, the password being the user's password;

utilizing the password to encrypt an encryption component, wherein utilizing the password comprises applying the password to the encryption component so as to produce a user-specifically encrypted version of the encryption component, the user-specifically encrypted version being user-specific in that the encryption process applied to the encryption component factors in the user's password, and wherein the encryption component is a collection of data that specifies an encryption or decryption process;

storing the user-specifically encrypted version of the encryption component, wherein storing comprises storing the user-specifically encrypted version of the encryption component within a record that is associated with the user;

selectively allowing the user to process the user-specifically encrypted version of the encryption component so as to derive the encryption component, wherein selectively allowing further comprises selectively allowing the user to decrypt the user-specifically encrypted version of the encryption component so as to regain access to the encryption component itself;

utilizing the decrypted encryption component to process sensitive data;

receiving a second password from a different user, the second password being the different user's password; and utilizing the second password to encrypt the encryption component, wherein utilizing the second password comprises applying the second password to the encryption component so as to produce a second user-specifically encrypted version of the encryption component, the second user-specifically encrypted version being user-specific in that the encryption process applied to the encryption component factors in the different user's password; and storing the second user-specifically encrypted version of the encryption component, wherein storing comprises storing the second user-specifically encrypted version of the encryption component within a record that is associated with the different user.

2. The method of claim 1, further comprising:
generating an encrypted version of the password; and storing the encrypted version of the password.

3. The method of claim 2, wherein storing the encrypted version of the password comprises storing the encrypted version of the password within a record that is associated with the user.

4. The method of claim 2, wherein generating an encrypted version of the password comprises encrypting the password based on a one-way hash function.

5. The method of claim 1, further comprising:
generating an encrypted version of the second password; and
storing the encrypted version of the second password within a record that is associated with the second user.

6. The method of claim 1, further comprising:
receiving an administrator password from an administrator; and
utilizing the administrator password as a basis for generation of an administrator-specific version of the encryption component; and
storing the administrator-specific version of the encryption component.

7. The method of claim 6, wherein storing comprises storing the administrator-specific version of the encryption key within a record that is associated with the administrator.

8. The method of claim 6, further comprising:
generating an encrypted version of the administrator password; and
storing the encrypted version of the administrator password within a record that is associated with the administrator.

9. The method of claim 1, wherein the encryption component is an application security key.

* * * * *